P. H. LINT.
FRUIT GATHERER.
APPLICATION FILED JAN. 3, 1918.
1,317,927.
Patented Oct. 7, 1919.
2 SHEETS—SHEET 1.
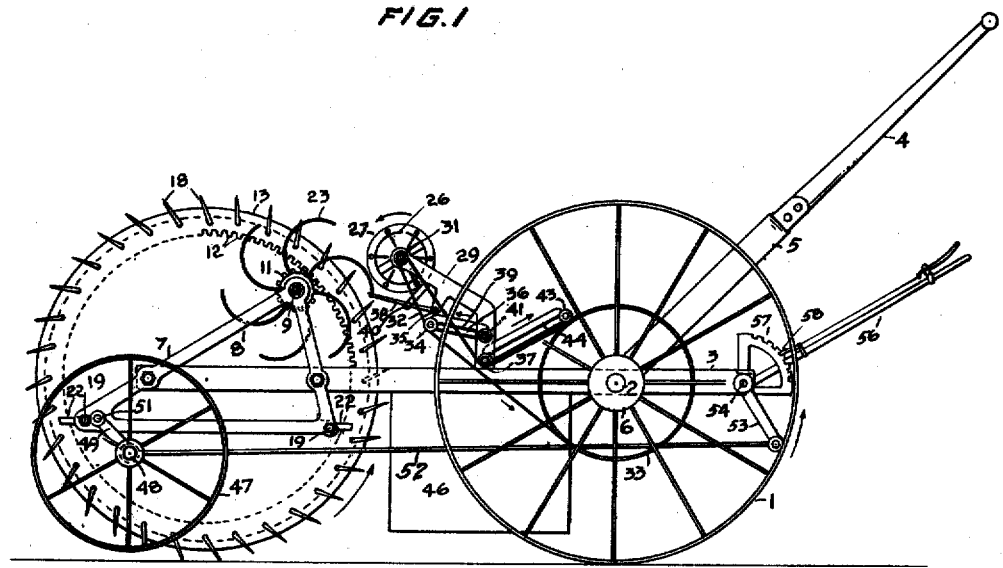
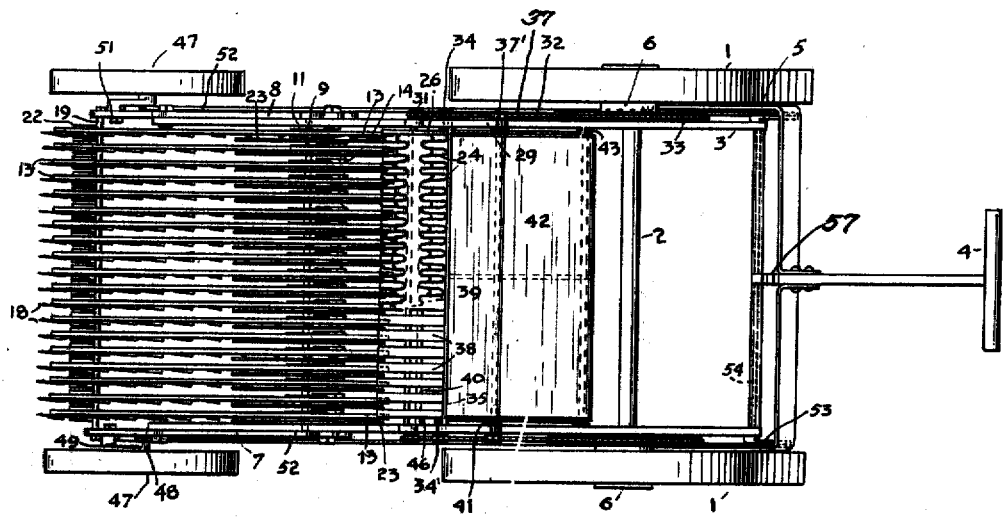
INVENTOR
P. H. LINT
ATT'Y.

P. H. LINT.
FRUIT GATHERER.
APPLICATION FILED JAN. 3, 1918.
1,317,927.
Patented Oct. 7, 1919.
2 SHEETS—SHEET 2.
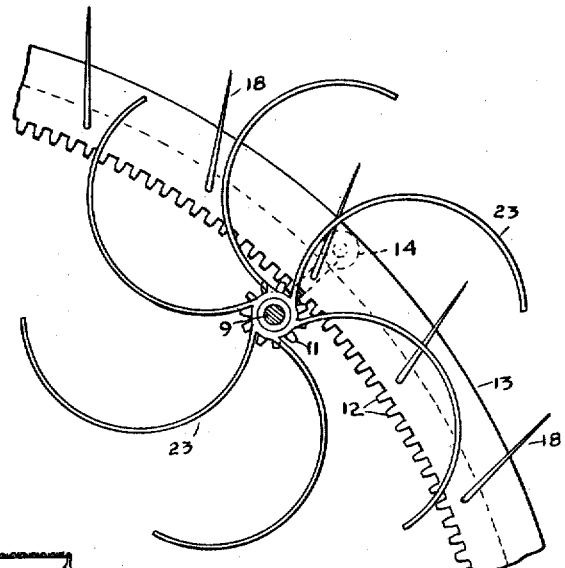
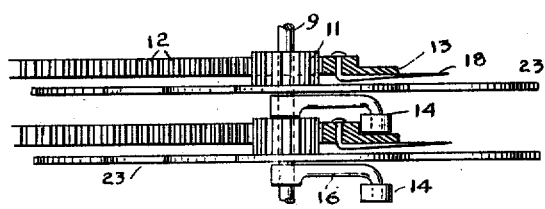
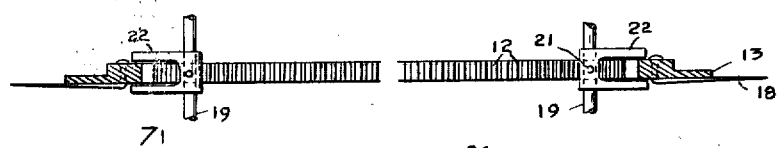
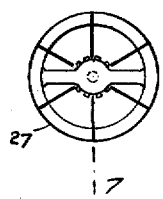
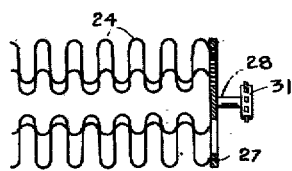
INVENTOR
P. H. LINT
BY
*Jm. Wright*
ATT'Y.

UNITED STATES PATENT OFFICE.

PETER H. LINT, OF EL CERRITO, CALIFORNIA.

FRUIT-GATHERER.

1,317,927.  Specification of Letters Patent.  Patented Oct. 7, 1919.

Application filed January 3, 1918. Serial No. 210,104.

*To all whom it may concern:*

Be it known that I, PETER H. LINT, a citizen of the United States, residing at El Cerrito, in the county of Contra Costa and State of California, have invented new and useful Improvements in Fruit-Gatherers, of which the following is a specification.

The object of the present invention is to provide a fruit gatherer, especially adapted for gathering prunes from the ground, which will accommodate itself to inequalities in the surface of the ground, and by which the fruit will be gathered and separated from leaves, twigs, and other foreign substances.

In the accompanying drawings, Figure 1 is a side view of the fruit gatherer; Fig. 2 is a plan view thereof; Fig. 3 is a detail longitudinal section thereof; Fig. 4 is an enlarged detail horizontal section; Fig. 5 is a view similar to Fig. 4; Fig. 6 is an end view of an advancing wheel; Fig. 7 is a detail broken sectional view on the line 7—7 of Fig. 6; Fig. 8 is a detail sectional view.

Referring to the drawing, 1 indicates wheels mounted upon a shaft 2 supported in the rear portion of a frame 3 and advanced by means of a handle 4 having a yoke 5, the ends of which are secured to bearings 6 of said shaft.

To the front portions of the sides of said frame are secured sides 7 of triangular frames 8. Through the vertices of said frames extends a shaft 9, on which are mounted pinions 11, which engage respectively internal gear teeth 12 of rings 13 held in engagement with said pinions by rollers 14 on the outer ends of bent arms 16, the inner ends of which are pivotally secured on said shaft. Said rollers engage the mortised outer edges of said rings. To said rings are secured prongs 18 which extend obliquely outward therefrom. As said rings roll on the ground their prongs 18, being in contact with the ground, penetrate fruit lying thereon, or engage the fruit so that it lies between the prongs. The triangular frames are prevented from dropping out of engagement with the rings, not only by the rollers 14, above described, but also by transverse shafts 19 through the other corners of said frames 8, to which shafts are pinned, as shown at 21, yokes 22 the side members of which engage opposite sides of the respective rings.

To the sides of the pinions 11 are also secured arms 23, which are equally spaced from each other and curve outward from said pinion. These curved arms or removers revolve rapidly with the pinions, and, as they revolve, since they intervene between adjacent prongs, they serve to remove from said prongs the prunes or other fruit raised by the prongs. Immediately that the fruit is raised from off the ends of the prongs, it is engaged by spring fingers 24 of an advancing wheel. Said fingers are formed of pieces of spring wire bent at regular intervals, to form fingers and to the ends of which are secured two disks 27 provided with trunnions 28 which rotate in bearings in ends of frame pieces 29 which are secured to the frame 1. Sprocket wheels 31 are carried on the outer ends of said trunnions 28 projecting through said frame pieces 29, and around said sprocket wheels 31 travel sprocket chains 32, which also travel around sprocket wheels 33 on the shaft 2, and around sprocket wheels 34 on extension frames 36 secured to the frame pieces 29, and also around sprocket wheels 37 rotatably carried by the frame pieces 29. Thereby the advancing wheel is rotated from the wheels 1. The advancing wheel thus serves to remove the prunes from the arms 23 and to advance them on to a chute formed of metal strips 38 loosely attached at their lower ends to a transverse bar 35 and resting upon a cross bar 40 spaced from the bar 35. Said metal strips are spaced sufficiently far apart so that the arms 23 can pass therebetween. From said chute 38 the prunes roll on to an upwardly and forwardly inclined endless draper 39, the rollers of which are rotated by sprocket wheels 34' on the same shafts as the sprocket wheels 34 and by sprocket wheels 41 rotatably carried on the frames 36. By the motion of said sprocket chains the draper is caused to move upwardly and forwardly and thereby tends to carry off all leaves, twigs and other foreign matter, whereas the prunes, being comparatively heavy and round, roll down the draper notwithstanding that it is traveling upward, and thus roll on to a second endless draper 42, to the rollers of which motion is imparted by sprocket wheels 37' on the same shafts as the sprocket wheels 37 and sprocket wheels 43, rotatably carried by extension frames 44 secured to the frame piece 29. This second draper is inclined upwardly and rearwardly and its upper portion also moves in that direction and serves to carry off leaves, twigs and other like foreign matter, while the prunes themselves roll down to the bottom of the draper and drop into an open box 46 carried by the frame between the wheels 1.

The following is the reason for employing two drapers traveling in opposite directions. A small rock, picked up from the ground, may roll down the first draper with the prunes unless it should happen to fall with a flat surface on the draper. But if it shall fail to fall on the first draper with a flat surface in contact with the draper, then, by providing two drapers traveling in opposite directions, there is a second chance for it to fall with a flat surface on a draper, and to be carried up by the draper away from the receptacle for receiving the prunes.

The frames 36 and 44 extend sufficiently above the drapers to form side guards for the prunes rolling down the drapers.

In order to prevent either endless draper from creeping to one side or the other, there is secured to the center of the inner side thereof, as shown in Fig. 8, a rope 59 which travels in annular grooves 61 in the centers of the rollers 62 of said drapers.

When it is desired to raise the rings 13 out of contact with the ground, this is done by means of front wheels 47 on shafts 48 supported by the lower ends of rearwardly directed arms 49, the upper ends of which are pivoted, as shown at 51, to the front corners of the frames 8. Said lower ends of the arms are connected to the front ends of links 52, the rear ends of which are connected to the lower ends of arms 53 depending from a shaft 54 having its bearings in the sides of the frame 3, to the center of which shaft is secured an end of an operating handle 56 provided with a rack 57 and latch 58 for holding said handle in any desired position.

Upon pressing the handle, the lower ends of the arms 53 are moved downwardly, thereby causing the front portion of the frame to be supported by the wheels 47 and raising the picker rings 13 from off the ground.

I claim:—

1. In a fruit gathering machine, the combination of side frames, upper and lower transverse shafts, the ends of which are mounted in said side frames, independent picker rings having internal gear teeth, each ring encircling all of said shafts, forks extending from the lower of said shafts, their members engaging opposite sides of the respective rings, pinions on an upper shaft meshing with the internal teeth of the respective rings, means engaging an outer portion of each ring for holding it in engagement with the corresponding pinion, removers extending from said pinions between the rings, and means for advancing the fruit from said removers.

2. In a fruit gathering machine, the combination of side frames, three transverse shafts, the ends of which are mounted in said side frames, independent picker rings having internal gear teeth, each ring encircling all of said shafts, devices extending from two of said shafts and engaging opposite sides of the respective rings, pinions on the third shaft meshing with the internal teeth of the respective rings, means engaging an outer portion of each ring for holding it in engagement with the corresponding pinion, removers extending from said pinions between the rings, and a wheel and spring fingers carried thereby for advancing the fruit from said removers.

3. In a fruit gathering machine, the combination of side frames, three transverse shafts, the ends of which are mounted in said side frames, independent picker rings having internal gear teeth each ring encircling all of said shafts, forks extending from two of said shafts and engaging opposite sides of the respective rings, pinions on the third shaft meshing with the internal teeth of the respective rings, means engaging an outer portion of each ring for holding it in engagement with the corresponding pinion, removers extending from said pinions between the rings, means for advancing the fruit from said removers, and an inclined draper arranged to travel upwardly, and down which the fruit can roll, and a box carried by the frame and arranged to receive the fruit leaving said draper.

4. In a fruit gathering machine, the combination of side frames, three transverse shafts, the ends of which are mounted in said side frames, independent picker rings having internal gear teeth, each ring encircling all of said shafts, devices extending from two of said shafts and engaging on opposite sides the respective rings, pinions on the third shaft meshing with the internal teeth of the respective rings, means engaging an outer portion of each ring for holding it in engagement with the corresponding pinion, removers extending from said pinions between the rings, a wheel and spring fingers carried thereby for advancing the fruit from said removers, a chute on to which the fruit is moved by said wheel, and drapers arranged to travel upwardly, and inclined upward in opposite directions, down which the fruit can roll in succession, and a box carried by the frame and arranged to receive the fruit leaving said drapers.

5. In a fruit gathering machine, the combination of rotary fruit picking apparatus, removers for removing the fruit from said picking apparatus as it rotates, and endless drapers for separating foreign material from the fruit, said drapers traveling upwardly in opposite directions and being arranged to receive thereon in succession the foreign material.

PETER H. LINT.

Copies of this patent may be obtained for five cents each, by addressing the "Commissioner of Patents, Washington, D. C."